Patented June 20, 1933

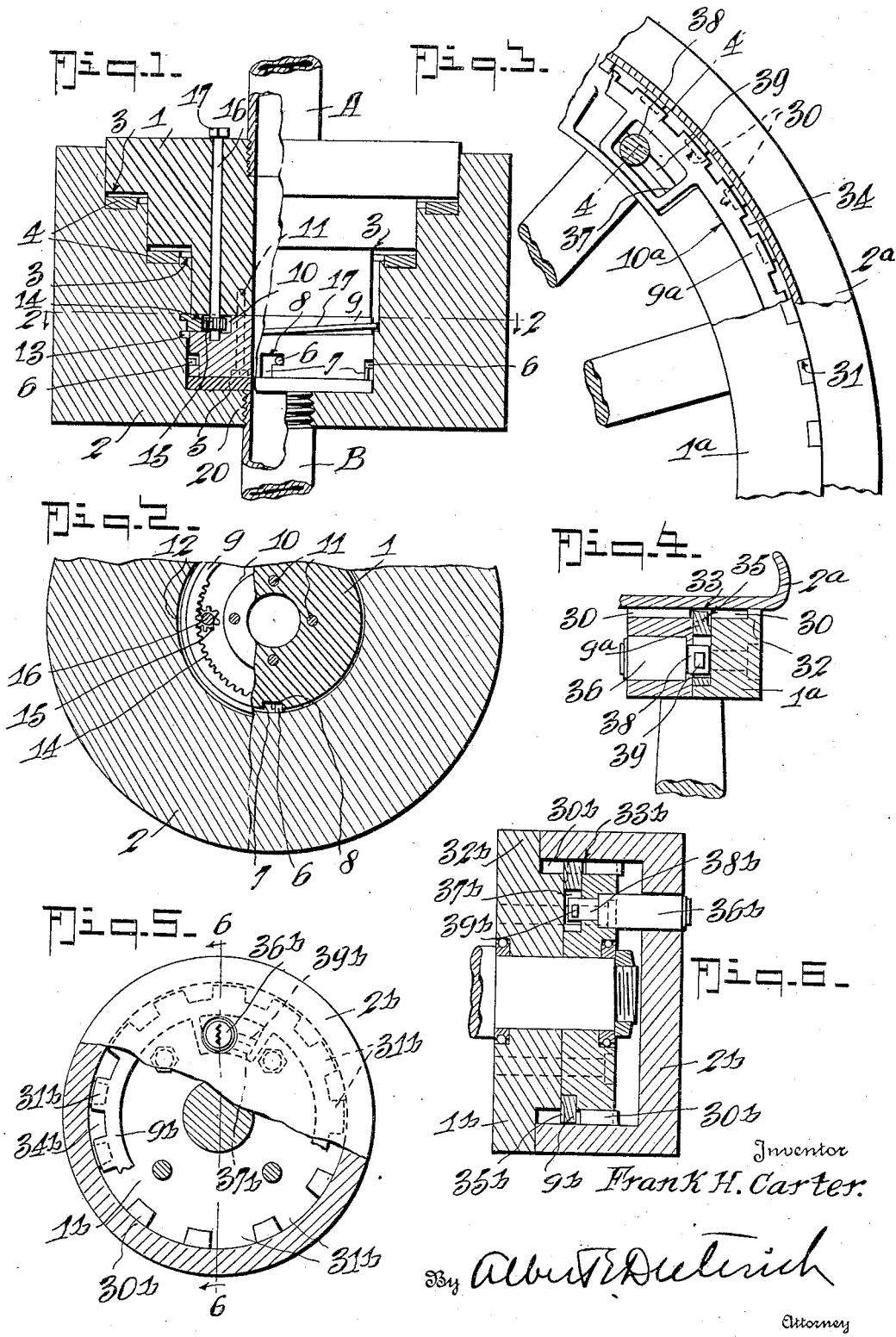

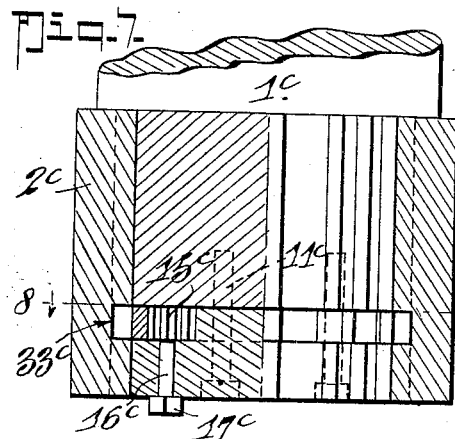
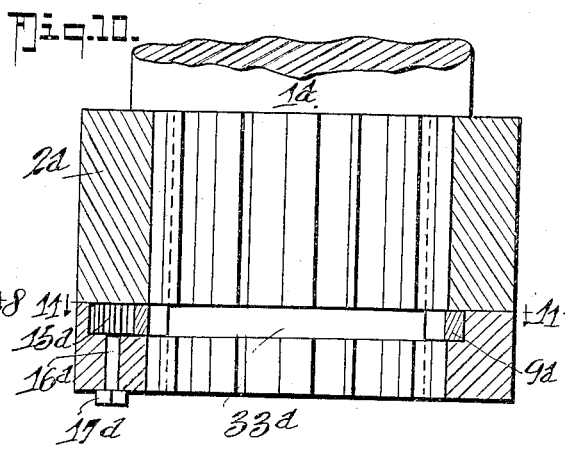
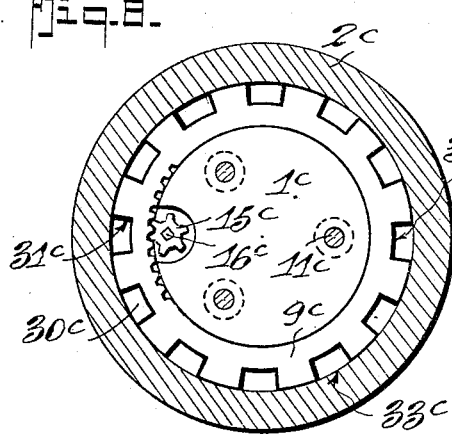
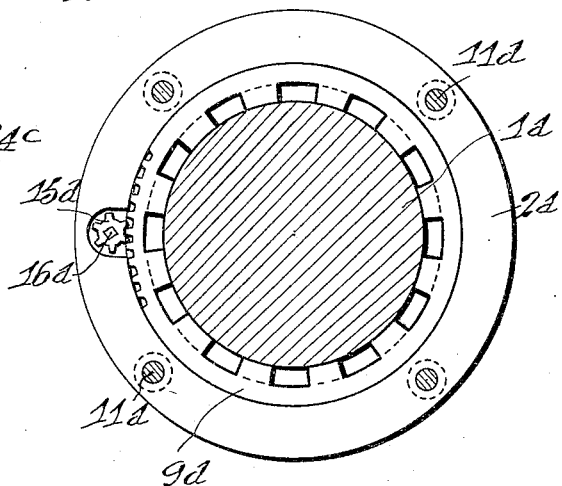
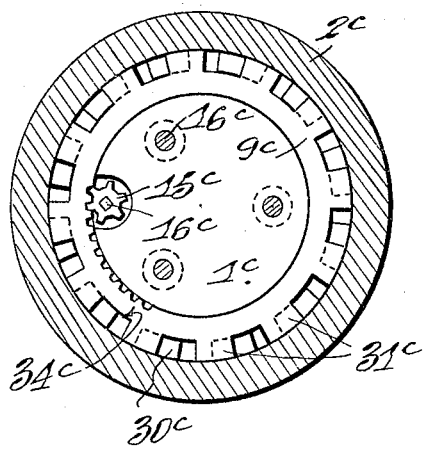

1,915,014

UNITED STATES PATENT OFFICE

FRANK H. CARTER, OF TAFT, CALIFORNIA, ASSIGNOR TO LUCINDA CARTER, OF TAFT, CALIFORNIA

LOCKING DEVICE

Application filed October 10, 1932. Serial No. 637,176.

This invention provides for detachably connecting any two relatively telescopic members, and is particularly applicable to cooperating annular members which are adapted for non-rotation relative to one another.

It is a particular object of the invention to provide one of the cooperating members with a locking annulus adapted for rotation after the telescopic engagement is made so as to engage a cooperating element of the other member for positively locking the telescopic connection against axial disengagement.

It is a further object of the invention to adapt the locking annulus for wedging engagement whereby the cooperating members are axially drawn into tight telescopic engagement when the locking annulus is shifted to operative position.

It is a still further object of the invention to provide the telescopic members with cooperating means adapted for circumferential abutment for locking the members against relative rotation, with the locking annulus adapted for positioning to permit said telescopic non-rotatable engagement of the cooperating members, and the locking annulus being then rotated so as to lock the members against axial disengagement.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is an axial section through a coupling for lengths of pipe, with said coupling embodying the invention.

Figure 2 is a transverse section on the line 2—2 of Figure 1.

Figure 3 is a fragmentary side elevation of a cooperating wheel and tire rim embodying the invention.

Figure 4 is a transverse section on the line 4—4 of Figure 3.

Figure 5 is a front elevation of a wheel hub and its cooperating bearing annulus embodying the invention, with the hub partly broken away.

Figure 6 is an axial section on the line 6—6 of Figure 5.

Figure 7 is a vertical longitudinal section and part elevation of a further embodiment of the invention.

Figure 8 is a horizontal section on the line 8—8 of Figure 7 with the locking ring in the release position.

Figure 9 is a section similar to Figure 8 with the locking ring in the locked position.

Figure 10 is a view similar to Figure 7 of a further embodiment of the invention in which the locking ring is carried by the female member.

Figure 11 is a horizontal section on the line 11—11 of Figure 10 with the locking ring in the release position.

Referring first to Figures 1 and 2 showing the invention embodied in a pipe coupling, the coupling elements 1—2 are adapted for telescopic engagement and are respectively connected to lengths of pipe A and B, with the construction preferably forming what in the oil production industry is known as a "Christmas tree".

The construction provides for initially engaging the cooperating coupling elements so as to prevent disengagement thereof by pressure in the pipe line, with a locking annulus then rotated so as to positively lock the coupling elements against axial or circumferential movement, and rotation of the locking annulus to its operative position is adapted to draw the cooperating elements into tight telescopic engagement so as to operatively expand suitable packing means for packing-off the flow of fluid.

As an instance of this arrangement the telescopic elements 1—2 are preferably shouldered as shown at 3 so as to provide a plurality of annular abutment surfaces adapted to support gaskets 4, and a gasket 5 is preferably also provided between the end of inner coupling element 1 and the cooperating end surface 20 of the outer coupling element 2.

Cooperating means in the bore of element 2 and at the outer periphery of element 1 are adapted for engagement when the coupling elements are first telescopically engaged, and by slight relative rotation of the elements said cooperating means are adapted to initially lock the coupling against axial disengagement and also limit said relative rotation of the parts.

For this purpose circumferentially spaced pins 6 project radially into the bore of element 2 adjacent its inner end, and bayonet grooves 7 in the periphery of element 1 are adapted to receive the pins so that slight rotation of element 1 will engage the pins in the horizontal arms 8 of the bayonet grooves so as to initially hold elements 1—2 against axial displacement and at the same time prevent further relative rotation of said parts.

A locking annulus is then adapted for rotation so as to positively lock elements 1—2 against axial or circumferential displacement, and said operative engagement of the locking annulus is also adapted to axially draw elements 1—2 into tight telescopic engagement so as to operatively expand gaskets 4 and 5 and thus provide a fluid tight coupling, it being noted that the horizontal arms 8 of the aforementioned bayonet grooves are of a width permitting some axial play of pins 6 in order that the locking annulus may thus axially tighten the telescopic engagement.

As an instance of this arrangement a ring 9 is rotatably mounted in a peripheral groove 10 of element 1, the ring being adapted for ready mounting in any usual manner, as for example by forming element 1 in two parts meeting at the groove 10 and suitably connected as shown at 11. The ring 9 has a thread 12 of coarse pitch projecting radially beyond the periphery of element 1 and adapted for free sliding reception in the bore of element 2, and the bore of element 2 is threaded at 13 so as to engage thread 12 by rotation of ring 9 after the initial engagement at pin and slot 6—8 has been made. It will thus be seen that the threaded engagement 12—13 will secure the telescopic elements 1—2 against axial or circumferential disengagement and will also draw said elements into tight telescopic engagement so as to operatively engage the packing gaskets.

The locking ring 9 may be rotated by suitable actuating means mounted in element 1, and for this purpose a gear 14 may be formed at the inner periphery of ring 9, with a pinion 15 meshing with the gear and fixed on a shaft 16 which is journaled in element 1 with its end projecting axially beyond the outer end of said element and provided with a head 17 adapted for engagement by a suitable tool such as a ratchet wrench (not shown) for rotating the shaft.

Figures 3 and 4 show the locking connection embodied in relatively telescopic elements such as the felly 1a of a wheel and a cooperating tire rim 2a. The rim and felly are provided with cooperating axial tongues and grooves 30 and 31 providing for lateral reception of the rim on the felly so as to lock the parts against relative rotation, with an annular shoulder 32 at one side of the felly preferably adapted for abutment by tongues 30 for limiting relative lateral movement of the parts.

A locking ring 9a is mounted in an annular groove 10a in the felly, and the tongues 30 of the tire rim are interrupted as shown at 33 for reception of the outer peripheral portion of the locking ring. The locking is grooved at 34 so that the ring may be turned to align grooves 34 with grooves 31 and thus permit lateral reception of the rim on the felly, after which the locking ring is rotated so as to stagger grooves 34 relative to grooves 31 as shown in Figure 3, thereby locking the rim in place by the non-grooved portions of the locking ring seating in the cooperating annular space 33 which is formed by the interrupted tongues 30. In order to draw the felly and rim into tight locking engagement, the face of ring 9a may taper adjacent the grooves 34 as shown at 35, so as to provide for wedging engagement of the locking ring in the spaces 33 which are formed by the interrupted tongues.

The ring 9a is preferably adapted to be rotated and locked in operative position by a usual lock mechanism 36 mounted in felly 1a and controlled by a suitable key (not shown). For this purpose ring 9a is provided with a slot 37 adapted to receive the barrel 38 of the lock mechanism, and the barrel has a transverse bolt 39 adapted to be extended and locked in position projecting radially beyond one side or the other of the barrel by turning the key of the lock, and when so projected the bolt engages one end or the other of slot 37 for rotatably shifting the locking ring to position aligning or non-aligning its grooves 34 with the grooves 31 of the felly.

A similar locking connection may be provided between the hub 2b of a wheel and its usual cooperating bearing support 1b as shown in Figures 5 and 6. In this instance cooperating tongues and grooves 30b and 31b are formed in the bore of the hub and in the periphery of its bearing support, with a shoulder 32b of the bearing support limiting telescoping of the parts, and a locking ring 9b which is journaled in the bearing support 1b projects radially into an annular space 33b which is formed by interrupting tongues 30b, and the locking ring is grooved at 34b for alignment or non-alignment of said grooves with the grooves 31b.

The face of the locking ring may taper at 35b to provide a wedging engagement as previously described when the ring is turned to locking position; and the ring is turned and locked in operative or inoperative position by a lock mechanism 36b, the barrel 38b of which projects into a slot 37b of the locking ring, with the bolt 39b of the barrel adapted to rotatably shift the ring 3b and lock the same with its grooves 34b aligned or staggered with relation to grooves 31b.

In Figure 7 is shown another embodiment of my invention in which a collar is shown secured to the end of a shaft. In this figure the locking ring 9c is carried by the male member 1c and is operated by the gear 15c on the shaft 16c which has a head 17c to which a wrench may be applied.

In Figure 10 is shown another embodiment in which the locking ring 9d is carried by the female member 2d.

In Figures 7 to 11 inclusive those parts which correspond to like parts in the preceding figures bear the same reference numeral plus the index letter c (Figures 7, 8 and 9) or plus the index letter d (Figures 10 and 11), and as the operations of these embodiments of the invention are essentially the same as the preceding ones a further description thereof is believed to be unnecessary.

The invention thus provides for readily locking cooperating telescoping elements against both axial and circumferential movement, and also provides for drawing the cooperating elements into tight telescopic engagement and thus avoids all relative play and provides for a tight packing engagement when such is desired.

This application is a continuation in part of my application filed May 27, 1930, Serial No. 455,991, allowed February 29, 1932.

From the foregoing description, taken in connection with the accompanying drawings, it is thought the complete construction, operation and advantages of my invention will be clear to those skilled in the art to which it relates.

What I claim is:

1. In combination, interfitting annular members, a locking ring journaled on one of said members and projecting radially therebeyond, a cooperating recess in the other of said members adapted to receive the ring for locking the members against relative axial displacement by rotation of the ring relative to said members, and actuating means for rotating the locking ring, said actuating means being mounted in the first mentioned member in spaced relation from the outer periphery thereof and extending longitudinally of said member and projecting through the outer end surface thereof for access to said actuating means for operating the same.

2. In combination, interfitting members, a locking element mounted on one of said members for sliding movement around the same, a cooperating recess in the other of said members adapted to receive the locking element for locking the members against displacement by sliding movement of the locking element around the interfitting members, and actuating means for sliding the locking element, said actuating means being mounted in and surrounded by the first mentioned member and projecting therethrough for access to said actuating means for operating the same.

3. In combination, interfitting annular members, a locking ring journaled on one of said members and projecting radially therebeyond, a cooperating recess in the other of said members adapted to receive the ring for locking the members against relative axial displacement by rotation of the ring relative to said members, and actuating means including an operating connection at the inner periphery of the locking ring for rotating said ring, said actuating means being mounted in the first mentioned member in spaced relation from the outer periphery thereof and extending longitudinally of said member and projecting through the outer end surface thereof for access to said actuating means for operating the same.

4. In a device of the character described, a two-part coupling including separate means for both parts adapted relatively to loosely coengage to hold the parts in working relationship, and means cooperating with both parts of said coupling and operating independently of said first means to cause relative movement between said parts and to lock said parts against disengagement and movement.

5. In a two-part coupling, one of said parts being socketed and the other of said parts being adapted to be received within said socket, means for interlocking said parts upon a slight turning movement of one of said parts, and further means including a cam ring carried by one part, the other part having a cam groove to cooperate with said ring for producing relative movement between said parts when the cam ring is rotated to hold both parts of the coupling against separation.

6. Two interfitting members, means to initially lock said members against free rotation and against disengagement by movement in the direction of their axes upon interfitting said members, a locking element rotatably carried by one of said members and cooperatively engaging the other of said members for imparting relative longitudinal movement to said members to cause their tight engagement, said locking element being enclosed by said members, and means projecting to the outside of said members by which said locking element may be operated.

7. Two interfitting members having stepped annular portions, a locking ring carried by one of the stepped portions and cooperatively engaging the mating stepped portion of the other member, said ring being concealed by said members and having provisions, when rotated in one direction, for locking said members together, and means within one of said members for rotating said ring, and including a portion extending through said members and having an exposed operating terminal.

8. Two interfitting members having stepped annular portions, a locking ring carried by one of the stepped portions and cooperatively engaging the mating stepped portion of the other member, said ring being concealed by said members and having provisions, when rotated in one direction, for locking said members together, and means within one of said members for rotating said ring, and including a portion extending through said members and having an exposed operating terminal, and other means operable upon the initial interfitting of said members and upon slight relative rotation between said members for initially interlocking the same.

9. Two interfitting members each having alternating ribs and grooves, those of one member interlocking with those of the other member to prevent relative rotation between said members upon the partial insertion of the one member into the other member, a locking ring carried by one of said members and having a projected portion provided with alternating ribs and grooves to register with those of the members when the ring is in one position and to be out of register therewith when said ring shall have been moved around to another position, thereby preventing separation of the two members, said ring being concealed by said members when they are interfitted, and a ring rotating means carried by the member which carries the ring and operable from the outside of said interfitting members.

10. Two members having male and female engagement, said members having tongues and grooves extending in a direction approximately parallel to the axes of said members, said tongues and grooves being divided by an annular groove, a locking ring-like element carried by one of said members to lie in part in said annular groove and itself having tongues and grooves corresponding to those of said members whereby when said tongues and grooves of said locking element are brought into register with those of said members said members may be interfitted, and means to rotate said locking element to move its tongues and grooves out of register with those of said members.

11. Two members having male and female engagement, said members having tongues and grooves extending in a direction approximately parallel to the axes of said members, said tongues and grooves being divided by an annular groove, a locking ring-like element carried by one of said members to lie in part in said annular groove and itself having tongues and grooves corresponding to those of said members whereby when said tongues and grooves of said locking element are brought into register with those of said members said members may be interfitted, and means to rotate said locking element to move its tongues and grooves out of register with those of said members, said locking member having provisions for forcing said two members tightly together when said locking member is rotated in one direction.

12. Means for locking male and female members together comprising a locking element mounted on one of said members, the other member having a recess cooperatively to receive a portion of said locking element, said locking element being wholly concealed when said members are together, means within that member which carries said locking element for rotating the same about the axis of the member and having a portion projecting through the member in which said means is mounted to the outside thereof and there provided with means by which it may be operated.

FRANK H. CARTER.